(12) United States Patent
Sahin et al.

(10) Patent No.: US 10,341,907 B1
(45) Date of Patent: Jul. 2, 2019

(54) MULTI-NETWORK WIRELESS MANAGEMENT AND TRANSPORT SELECTION

(71) Applicant: Charter Communications Operating, LLC, St. Louis, MO (US)

(72) Inventors: Yildirim Sahin, Englewood, CO (US); Curt C. Wong, Bellevue, WA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 15/984,639

(22) Filed: May 21, 2018

Related U.S. Application Data (60) Provisional application No. 62/657,596, filed on Apr. 13, 2018.

(51) Int. Cl.
*H04W 84/02* (2009.01)
*H04W 36/00* (2009.01)
(Continued)

(52) U.S. Cl.
CPC ......... *H04W 36/0022* (2013.01); *H04L 69/16* (2013.01); *H04L 69/18* (2013.01); *H04W 36/0016* (2013.01); *H04W 84/042* (2013.01)

(58) Field of Classification Search
CPC ..... H04W 48/18; H04W 60/00; H04W 36/14; H04W 76/16
(Continued)

(56) References Cited

U.S. PATENT DOCUMENTS 7,369,537 B1 * 5/2008 Kirchhoff ............... H04L 12/66
370/352
2009/0052392 A1 * 2/2009 Sumasu ................ H04L 1/1887
370/331
(Continued)

OTHER PUBLICATIONS

Ericsson, et al., "Interworking without N26 corrections", Feb. 26-Mar. 2, 2018, pp. 1-8, 3GPP TSG-SA WG2 Meeting #126, S2-182379, Montreal, Canada.
(Continued)

*Primary Examiner* — Sam Bhattacharya
(74) *Attorney, Agent, or Firm* — Armis IP Law, LLC (57) ABSTRACT

A communication management resource receives first input registering user equipment to use wireless network services of a first wireless network and a second wireless network. The communication management resource receives second input from the user equipment registering the user equipment to use voice services. In response to receiving a phone communication indicating a corresponding phone call, the communication management resource selects a transport protocol from multiple possible transport protocols to establish a communication session between the communication management resource and the user equipment. The communication management resource initially establishes a communication link or communication session for the corresponding phone call over the first wireless network between the user equipment and the communication management resource using the selected transport protocol. The user equipment is then handed off to a communication link in the second wireless network to support the corresponding phone call.

28 Claims, 7 Drawing Sheets

(51) Int. Cl.
*H04L 29/06* (2006.01)
*H04W 84/04* (2009.01)

(58) Field of Classification Search
USPC .................. 455/436–438; 370/328, 329, 331
See application file for complete search history.

(56) References Cited

U.S. PATENT DOCUMENTS

2014/0269619 A1* 9/2014 Surface ............. H04W 36/0083
370/331
2017/0201627 A1* 7/2017 Fukuda ............... H04L 65/1053

OTHER PUBLICATIONS

Stojanovski, Saso, "LS on EPS fallback for voice", Feb. 26-Mar. 2, 2018, pp. 1-14, 3GPP TSG CT WG1 Meeting #108, C1-181030, Montreal (Canada).
QUALCOMM Incorporated, "Use TCP for SIP signaling in case of voice fallback to EPS without N26 interface", Feb. 26-Mar. 2, 2018, pp. 1-17, 3GPP TSG-CT WG1 Meeting 109, C1-181444, Montreal (Canada).
Ericsson, et al., "Interworking without N26 corrections", Feb. 26-Mar. 2, 2018, pp. 1-3, 3GPP TSG-SA WG2 Meeting #126, S2-182378 (revision of S2-181690), Montreal Canada.
Ericsson, et al., "EPS Fallback for voice further enhancements", Feb. 26-Mar. 2, 2018, pp. 1-10, 3GPP TSG-SA WG2 Meeting #126, S2-182380 (revision of S2-181692), Montreal Canada.
Ericsson, et al., "EPS Fallback for voice", Feb. 26-Mar. 2, 2018, pp. 1-3, 3GPP TSG-SA WG2 Meeting #126, S2-181636, Montreal Canada.
QUALCOMM Incorporated, "Possible solutions to recover lost SIP messages during EPS fallback for IMS voice without N26 interface", Apr. 16-20, 2018, pp. 1-3, 3GPP TSG CT WG1 Meeting #110, C1-182194, Kunmig (P.R. of China).
QUALCOMM Incorporated, "Solution to recover lost SIP messages in case of EPS fallback for IMS voice without N26 interface", Apr. 16-20, 2018, pp. 1-18, 3GPP TSG CT WG1 Meeting #110, C1-182195, Kunmig (P.R. of China).
Motorola Mobility—Lenovo, "EPS fallback for an IMS session setup", Apr. 16-20, 2018, pp. 1-10, GPP TSG CT WG1 Meeting #110, C1-182176, Kunmig (P.R. of China).

\* cited by examiner

MULTI-NETWORK WIRELESS MANAGEMENT AND TRANSPORT SELECTION

RELATED APPLICATIONS

This application is related to and claims the benefit of earlier filed U.S. Provisional Patent Application Ser. No. 62/657,596 entitled "WIRELESS NETWORK REDIRECT DURING VOICE CALLS AND TRANSPORT PROTOCOL OPTIMIZATION,", filed on Apr. 13, 2018, the entire teachings of which are incorporated herein by this reference.

BACKGROUND

Conventional LTE (Long Term Evolution) cellular networks typically include a core network, a RAN (Radio Access Network), and one or more mobile communication devices (user equipment). The radio access network resides between user equipment (such as a mobile phone, a computer, or any remotely controlled machine) and provides connectivity with its core network (CN). As its name suggests, the radio access network provides respective user equipment access (such as Internet access) via the core network.

So-called 3rd Generation Partnership Project (3GPP) unites telecommunications standard development organizations (such as ARIB, ATIS, CCSA, ETSI, TSDSI, TTA, TTC), known as "Organizational Partners" and provides their members with a stable environment to produce the Reports and Specifications that define 3GPP technologies.

According to 3GPP TS 23.501 (Section 5.16.3), in order to support various deployment scenarios for obtaining IMS (IP Multimedia Subsystem) voice service, a serving PLMN (Public Land Mobile Network) over 3GPP access in 5GS (5G System) may provide IMS Voice over PS session in NR (New Radio) connected to 5GC (5G Core), via handover procedure to EPS (Evolved Packet System), via handover to E-UTRA connected to 5GC, or via redirection to EPS.

During the QoS Flow establishment procedure for IMS Voice, NG-RAN may trigger IMS Voice via handover or redirection procedure based on UE capabilities, N26 such as an interface between MME (Mobility Management Entity) and AMF (Access and Mobility Function) availability, network configuration and radio conditions. In the case of handover and redirection scenarios the IP (Internet Protocol) address of the UE (User Equipment) is preserved.

One of the triggering conditions for the NG-RAN to select the redirection to EPS (a.k.a., EPS fallback) procedure is when the interworking with N26 is not supported between the AMF (Access Mobility Function) and MME (Mobile Management Entity).

For this use case, during the 5G Registration of a UE, the serving PLMN (Public Land Mobility Network) AMF provides following relevant indications to the UE in Registration Accept message indicating that redirection to EPS is feasible for the registered UE in the Registration Area (as per Section 4.2.2.2.2 in 3GPP TS 23.502, Section 5.16.3.2 in 3GPP TS 23.501):

1) Network Support of Interworking without N26
2) IMS Voice over PS Session Supported Indication Together with the indication above (i.e. Network Support of Interworking without N26 signaling), this indication means that UE supports redirection to EPS, EPS supports IMS voice, and NG-RAN supports redirection to EPS for this UE at QoS Flow establishment for IMS Voice.

For this purpose, as per the 3GPP specification, the AMF may need to perform the UE/RAN Radio information and Compatibility Request procedure during UE Registration to check the compatibility of the UE and RAN radio capabilities related to IMS Voice over PS.

Based on two indications above, the UE is aware of all the prerequisites required in the network (and the UE) that NG-RAN may redirect an IMS voice session to the E-UTRA in EPS.

BRIEF DESCRIPTION OF EMBODIMENTS

There are deficiencies associated with conventional wireless networks. For example, according to 3GPP SA2 WG analysis depicted in S2-181212, when inter-working between networks using N26 signaling is not supported, the estimated service break due to fallback from a 5GS (first) network to an EPS (such as a 4G network or se cable network) is estimated roughly to be within the 1-3 seconds range. As per the aforementioned analysis, such a service break of this duration might create undesirable interactions with the overall SIP (Session Initiation Protocol) session establishment signaling for Mobile Originated (MO) or Mobile Terminated (MT) IMS voice calls (a.k.a., IMS Multimedia telephony session with audio offer) flow establishment specifically loss of some SIP signaling messages (e.g. PRACK message or 200 OK for PRACK).

SIP message retransmissions over UDP transport should be able to cope with such service break, but some performance degradation is likely to occur due to IMS voice call establishment delays based on the SIP retransmission timer settings. Currently the recommended retransmission timer settings are specified in Section 7.7 of 3GPP TS 24.229. Therefore, using TCP transport for SIP session establishments for IMS voice may handle such service break better than UDP.

In certain instances, the user equipment (UE) and IM CN subsystem entities are capable of transporting SIP messages longer than 1300 bytes.

For a MO IMS Voice session, if the UE gets the Network Support of Interworking without N26 indication during UE Registration to 5GS, in order to address potential IMS voice call establishment delays, the UE may use TCP for transport of SIP messages towards the P-CSCF during the initiation of IMS Voice session. However, for MT IMS Voice sessions, because the communication management resource 140 (such as P-CSCF) does not have any knowledge of the 5GS network's support of interworking without N26, it may not be able to select the appropriate transport protocol intelligently.

For user equipment that is aware of the 5GS Network Support of Interworking without N26, the user equipment can be configured to perform SIP REGISTRATION with transport=tcp parameter in the Contact header to ensure that the communication management resource (P-CSCF) uses TCP connection for MT IMS Voice session establishments. In such an instance, the drawback of such method is that all other type of SIP services not requiring audio media stream (e.g. SMS transfer using SIP MESSAGE) would also use TCP (Transmission Control Protocol), which may result in heavy use resources at the communication management resource.

In contrast to conventional techniques, embodiments herein include:

1.) A method to inform, via status information, a communication management resource (such as P-CSCF or Proxy-Call Session Control Function) that a respective wireless network environment supports inter-working between a first wireless network and a second wireless network without N26 signaling for a UE (user equipment) registered in the first wireless network. As further described herein, the status information (indicating interworking of multiple wireless networks without N26 signaling) can be received by the communication management resource in any manner such as from the user equipment, from a PCF node in the network environment, etc.

2.) Based on such network capability information in the communication management resource (such as P-CSCF), for IMS voice session establishment signaling between the UE and the communication management resource, the communication management resource:
  a) either chooses TCP (Transmission Control Protocol) transport for the SIP signaling required for the MT IMS Voice session establishments, or
  b) chooses UDP (User Datagram Protocol) transport with updated the SIP message retransmission schema for certain SIP messages that are likely to be lost during EPS fallback or all SIP messages in the SIP transaction.

3.) In accordance with further embodiments, UDP transport can be selected for MO IMS Voice session signaling (user equipment originating voice calls) as well as MT IMS Voice session signaling (voice calls from a remote source to the user equipment).

As further described herein, a communication management resource receives first input over a first wireless network from user equipment registering the user equipment to use wireless network services of the first wireless network.

The communication management resource receives second input from the user equipment (or other suitable resource) registering (SIP registration) the user equipment to use voice services. In one embodiment, the second input includes status information indicating that there is interworking between the first wireless network and the second wireless network but no support for N26 signaling between (management nodes of) the first wireless network and the second wireless network.

As previously discussed, note again that alternative embodiments include storing the status information (indicating interworking with the second wireless network to establish voice calls without N26 signaling) in the PCF node (an accessible repository) of network environment during registration of the user equipment. For example, during registration of the user equipment, the AMF node in network environment can be configured to communicate the status information regarding no N26 signaling to the PCF node. When the user equipment performs registration with the communication management resource, the communication management resource receives the status information from the PCF node. Thus, as an alternative to receiving the status information from the user equipment during voice registration, the communication management resource can be configured to communicate with the PCF node to receive the status information indicating that the first wireless network supports interworking with the second wireless network to establish voice calls without N26 signaling. Accordingly, the communication management resource can receive the status information indicating interworking and no N26 signaling between networks in different ways.

While the user equipment is connected to the communication management resource over the first wireless network (such as via a non-voice data connection in which the user equipment is able to communicate over wireless network through the communication management resource to the remote network), in response to receiving a phone communication (such as a Mobile Terminating invite such as from a remote communication device) indicating that the user equipment is an intended recipient of a corresponding pending phone call, the communication management resource selects, based on the status information indicating the interworking between networks without N26 signaling, a transport protocol from multiple transport protocols (such as TCP, UDP, etc.) to establish a communication session (using SIP session signaling over TCP or UDP) between the communication management resource and the user equipment for the corresponding phone call.

In one embodiment, as previously discussed, if UDP is selected as the transport protocol, the communication management resource can be configured to use a UDP transport with a specific SIP message retransmission schema to accommodate the communication link break (when switching from use of wireless network to wireless network to support the call) and potential lost messages during the subsequent switchover. In other words, the switchover from the first wireless network to the second wireless network to support the voice call can result in lost communications between the communication management resource and the user equipment.

The communication management resource and corresponding first wireless network initially establish the communication session (such as via SIP signaling in the first wireless network) for the corresponding phone call over the first wireless network between the user equipment and the communication management resource using the selected transport protocol.

After establishing the communication session (or first communication link in wireless network to provide notification of the call to the user equipment), the communication management resource communicates one or more messages (such as including a SIP invite message) over the communication session (higher layer such as application layer in the first communication link) over the first wireless network to notify the user equipment of the corresponding phone call directed to the user equipment.

Via the first communication link in the first wireless network between the communication management resource and the user equipment, the first wireless network (or any suitable resource) notifies the user equipment to switchover (fall back) to signaling over the second wireless network (such as 4G network or EPS) to continue establishing the communication session (or prior signaling to establish a call connection in wireless network) over the second wireless network to establish a corresponding communication link to support voice communications associated with the corresponding phone call.

Via the continued signaling in the second wireless network, the second wireless network establishes the communication link (call connection) in which to support voice data between the user equipment and the communication device originating the phone call to the user equipment.

These and additional embodiments are further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, computer program product, etc., that supports operations as discussed herein.

One embodiment includes a computer readable storage medium and/or system having instructions stored thereon. The instructions, when executed by computer processor hardware, cause the computer processor hardware (such as one or more co-located or disparately processor devices) to: receive first input from user equipment registering the user equipment to use wireless network services of a first wireless network and a second wireless network; receive second input from the user equipment registering the user equipment to use voice services; and while the user equipment is connected to the link management resource over the first wireless network, in response to receiving a phone communication indicating a corresponding pending phone call, select a transport protocol from multiple transport protocols to establish a communication session between the link management resource and the user equipment.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a communication management resource receives first input registering user equipment to use wireless network services of a first wireless network and a second wireless network. The communication management resource receives second input from the user equipment registering the user equipment to use voice services. In response to receiving a phone communication indicating a corresponding phone call, the communication management resource selects a transport protocol from multiple possible transport protocols to establish a communication session between the communication management resource and the user equipment. The communication management resource initially establishes a communication link or communication session for the corresponding phone call over the first wireless network between the user equipment and the communication management resource using the selected transport protocol. The user equipment is then handed off to a communication link in the second wireless network to support the corresponding phone call.

Figure 1:
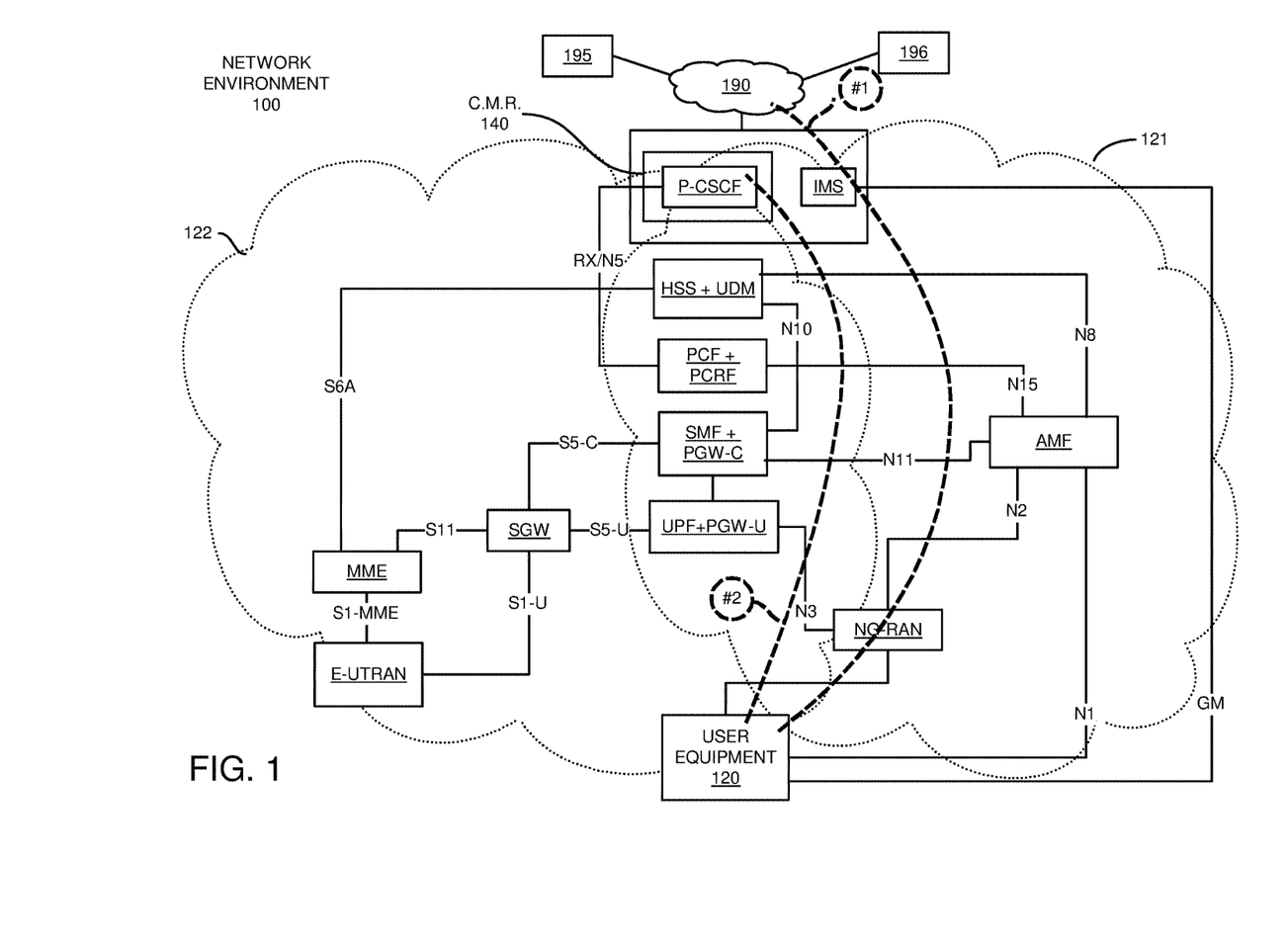
FIG. 1 is an example diagram illustrating connectivity of user equipment through a first wireless network according to embodiments herein.

FIG. 1 is an example diagram illustrating a network environment according to embodiments herein.

In this example embodiment, the network environment 100 includes appropriate resources (such as P-CSCF, IMS, HSS+UDM, etc.) to provide connectivity between user equipment 120 operated by a respective user and network 190. Each of the resources in network environment 100 (such as P-CSCF, IMS, HSS+UDM, etc.) can be configured to include hardware and corresponding executed software instructions to carry out embodiments herein.

In one embodiment, the network environment 100 is based on a non-roaming architecture such as based on FIG. 4.3.1 in 3GPP TS 23.501 v15.1.0. The Notes in the associated Section in aforementioned 3GPP specification applies. For some roaming architecture see Section 4.3 in 3GPP TS 23.501.

Note that based on network configuration/deployment, operator/roaming agreements, 4G LTE network and 5G NR network may belong to the same or different PLMN operators. If two PLMN operators are involved, one providing wireless network 121, the other providing wireless network 122, the IMS network 190 might be a home PLMN or visiting PLMN.

As further discussed below, embodiments herein include a UE-based approach and a network-based approach UE-Based Approach According to a UE-based approach, the communication management resource 140 (such as P-CSCF node) retrieves or receives status information (such as indication of no N26 signaling in network environment 100) from the user equipment 120 or other suitable resource.

Based on this information (notification of the absence of N26 signaling in network environment 100), the communication management resource 140 either chooses the TCP transport for MT IMS Voice session establishment signaling or uses UDP (User Datagram Protocol) transport with special SIP message retransmission schema for MT IMS Voice session establishment signaling in communication with the user equipment 120.

In general, in one embodiment, the following steps are used:

1. Via operation #1 in FIG. 1, the UE 120 performs registration to the first wireless network (such as a 5GS network) such as based on Section 4.2.2.2.2 in 3GPP TS 23.502 v15.1.0.

2. Further in operation #1, the user equipment 120 establishes the PDU Session for IMS services such as per Section 4.3.2.2 in 3GPP TS 23.502 v15.1.0.

3. Via operation #2, the UE 120 performs SIP registration for voice call IMS services such as per 3GPP TS 23.228.

More specifically, during the first wireless network (5G) registration by the user equipment 120 in operation #1, if the UE 120 receives status information indicating Network Support of Interworking without N26 in a corresponding Registration Accept message, the UE 120 informs the communication management resource 140 (P-CSCF node) about the first wireless network 121 (5GS) support for interworking without N26 during SIP REGISTER signaling for IMS services.

The UE 120 may inform the communication management resource 140 (such as P-CSCF node) with 5G network capability by using a new SIP message header field or by using an existing header (e.g. P-Access-Network-Info) or any other means during the signaling.

While the UE 120 is registered for IMS services, note that if the 5GS network's support for interworking without N26 for the UE changes (e.g. as part of UE's mobility registration update, or periodic registration update signaling) or UE capabilities related to EPS fallback (to wireless network 122) function changes, the UE can be configured to perform SIP re-registration to update the P-CSCF/IMS accordingly.

4. In one embodiment, EPS fallback for IMS voice session signaling flow can be implemented as described in Section 4.13.6.1 in specification 3GPP TS 23.502 v15.1.0. The communication management resource 140 (such as P-CSCF node) serving the user equipment 120 may:

a. Either use (select) a TCP transport protocol for use when establishing an MT IMS voice session (call invitation) towards this UE 120 in the associated first wireless network 121 (such as a 5G Access network). The communication management resource 140 (such as P-CSCF node) uses the selected TCP transport even if the size of the SIP INVITE message is shorter than 1300 bytes.

b. or use (select) UDP transport with a specific SIP message retransmission schema for certain SIP messages in the SIP transaction that are likely to be lost during the EPS fallback when establishing an MT IMS voice session towards this UE 120 in the associated first wireless network 121 (5G access network), or apply the specific SIP message retransmission schema for all SIP messages in that SIP transaction. For example, if a corresponding PRACK message is likely to be lost during the EPS fallback (switchover of the user equipment 120 from the first wireless network 121 to the second wireless network 122) and its retransmission intervals could be an implementation-specific constant value, e.g. 2 seconds with consideration of the expected session break time in the network during EPS fallback, instead of exponentially increasing retransmission timer intervals.

Note that the SIP message retransmission schema selected by the communication management resource 140 may be adaptive by gathering and utilizing the duration between the transmitted SIP message from the P-CSCF node and the expected SIP message in response from the UEs, who reported 5GS network's support for interworking without N26 in the same 5G access network, during the SIP session establishment signaling flows.

Note that if the SIP INVITE message size is longer than 1300 bytes, the communication management resource 140 may still use or select the TCP transport such as per specification 3GPP TS 24.229.

If UDP transport is used for SIP session establishment signaling (to establish a communication link to support a respective voice call), the communication management resource 140 (such as P-CSCF) can be configured to apply the same methodology described in Step 4b above for MO IMS Voice session establishment signaling for the UEs, who reported 5GS network's support for interworking without N26.

Network-Based Approach

According to a network-based solution, the P-CSCF node or communication management resource 140 retrieves or receives status information (indicating that N26 is not supported) from the PCF node. The following operations can include:

1. UE 120 performs 5G registration to 5GS network (to register for use of network 121) based on Section 4.2.2.2.2 in 3GPP TS 23.502 v15.1.0. In one embodiment, the serving AMF node in network 121 indicates to the PCF node whether N26 is used (such as step 15/16). The PCF node stores the status information in the UE context data for this user equipment 120.

2. When the UE 120 performs IMS registration to use wireless networks 121 and 122, the communication management resource 140 (such as a P-CSCF node) subscribes to the N26 status information from the PCF node. In TS 23.228, section Y.9.4, P-CSCF can already subscribe to PLMN ID notification. Embodiments herein allow the communication management resource 140 (P-CSCF node) to also subscribe to N26 status information (including when this N26 status information is changed).

3. The PCF node receives the status information (indicating N26 information) from the stored UE context data at the PCF node in step 1.

4. Same as Step 4 in the UE-based proposal above.

Figure 4:
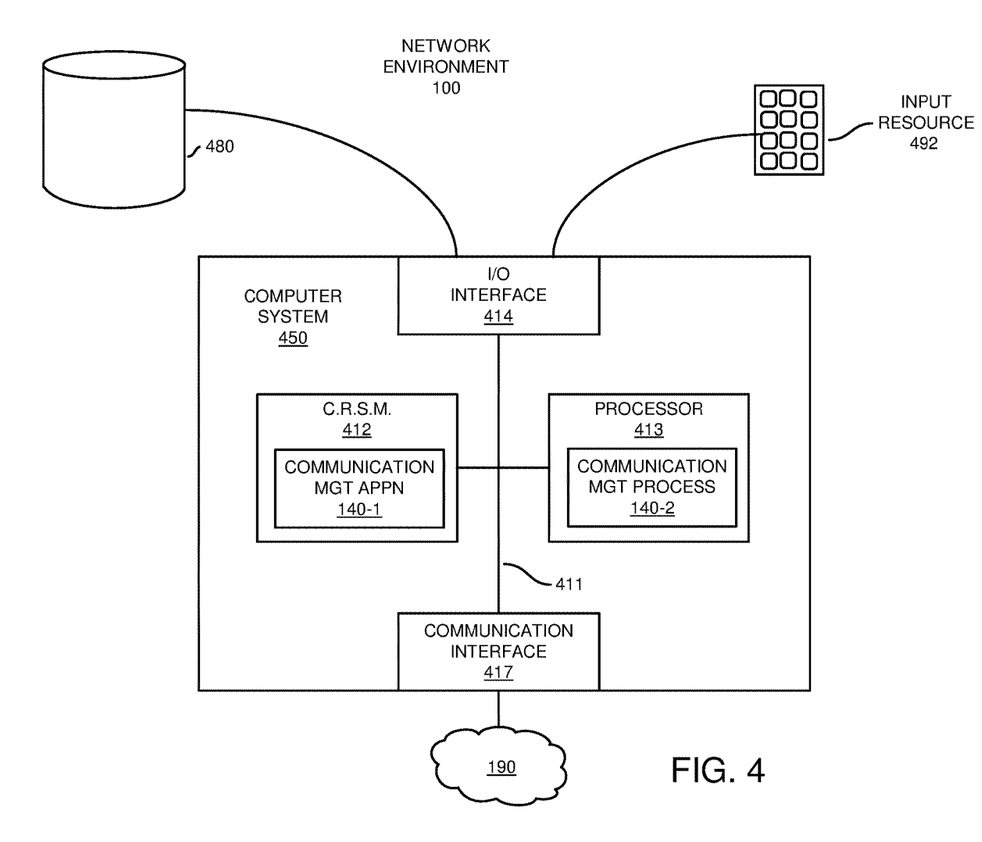
FIG. 4 is a diagram illustrating example computer architecture to execute one or more operations according to embodiments herein.

FIG. 4 is an example block diagram of a computer system for implementing any of the operations as discussed herein according to embodiments herein.

Any of the resources as discussed herein can be configured to include computer processor hardware and corresponding executable instructions to carry out the different operations as discussed herein.

As shown, computer system 450 of the present example can include an interconnect 411 that couples computer readable storage media 412 such as a non-transitory type of media (such as a type of hardware storage medium) in which digital information can be stored and retrieved, a processor 413, I/O interface 414, and a communications interface 417.

I/O interface 414 supports connectivity to repository 480 and input resource 492.

Computer readable storage medium 412 can be any hardware storage device such as memory, optical storage, hard drive, floppy disk, etc. In one embodiment, the computer readable storage medium 412 stores instructions and/or data.

As shown, computer readable storage media 412 can be encoded with management application 140-1 (e.g., including instructions) to carry out any of the operations as discussed herein.

During operation of one embodiment, processor 413 accesses computer readable storage media 412 via the use of interconnect 411 in order to launch, run, execute, interpret or otherwise perform the instructions in network management application 140-1 stored on computer readable storage medium 412. Execution of the network management application 140-1 produces network management process 140-2 to carry out any of the operations and/or processes as discussed herein.

Those skilled in the art will understand that the computer system 450 can include other processes and/or software and hardware components, such as an operating system that controls allocation and use of hardware resources to network management application 140-1.

In accordance with different embodiments, note that computer system may be or included in any of various types of devices, including, but not limited to, a mobile computer, user equipment, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 450 may reside at any location or can be included in any suitable resource in any network environment to implement functionality as discussed herein.

Figure 5:
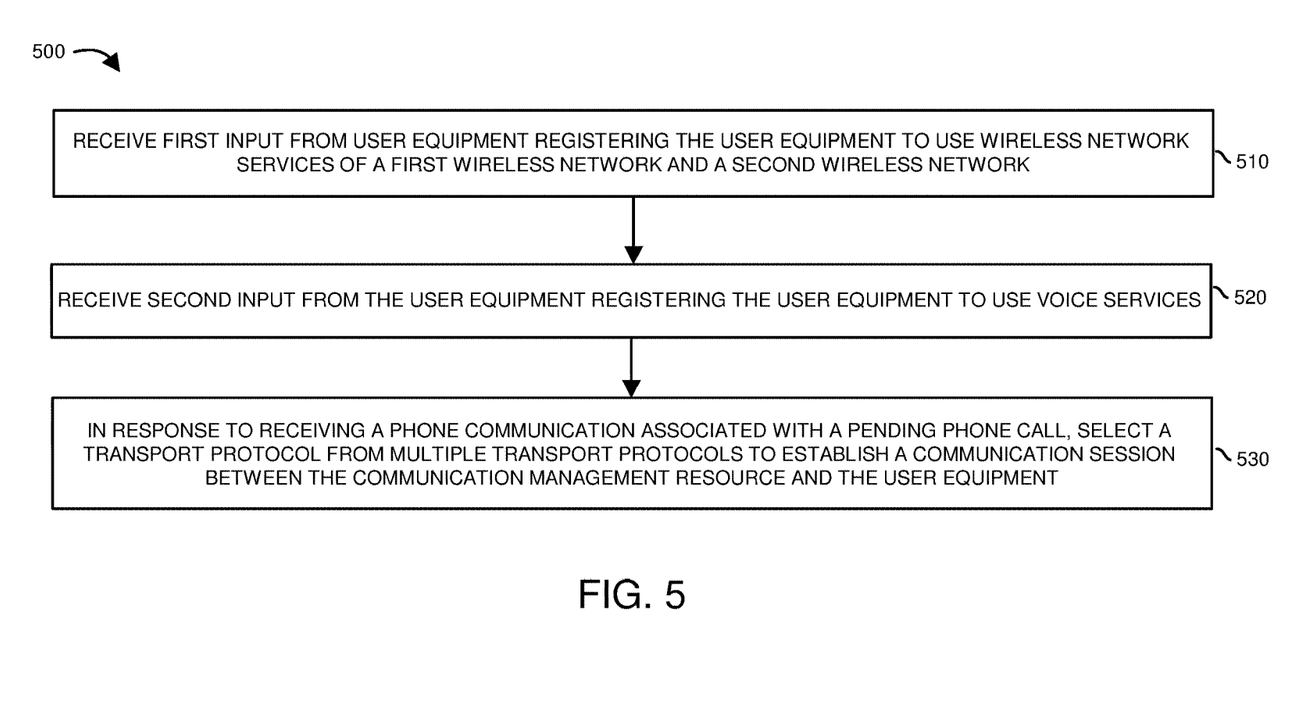
FIG. 5 is an example diagram illustrating a method according to embodiments herein.

Functionality supported by the different resources in FIG. 1 will now be discussed via flowcharts in FIGS. 5, 6, and 7. Note that the steps in the flowcharts below can be executed in any suitable order.

FIG. 3 is a flowchart 500 illustrating an example method according to embodiments herein. Note that there will be some overlap with respect to concepts as discussed above.

In processing operation 510, the first wireless network 121 (such as hardware and/or software) receives first input from user equipment 120 registering the user equipment 120 to use wireless network services of the first wireless network 121.

In processing operation 520, the communication management resource 140 receives second input (such as from the user equipment 120 or other suitable resource) registering the user equipment 120 for use of voice services.

In processing operation 530, while the user equipment 120 is connected or attached to the communication management resource 140 over the first wireless network 121, in response to receiving a phone communication (such as MT invite) indicating a corresponding pending phone call, the communication management resource 140 selects a transport protocol from multiple transport protocols (such as TCP, UDP, etc.) to establish a communication session (or communication link) between the communication management resource 140 and the user equipment 120 to support the phone call. In one embodiment, the selected transport protocol (such as TCP) supports confirmation of a destination receiving transmitted communications. In other words, a destination receiving communications from the communication management resource provides acknowledgment of receiving same. Alternatively, the communication management resource 140 selects UDP as the transport protocol and adjusts, for the selected UDP transport protocol, timing of message retransmission from the communication management resource to the user equipment to accommodate an outage of communication occurring when handing off the user equipment 120 from the first wireless network 121 to the second wireless network 122.

Figure 6:
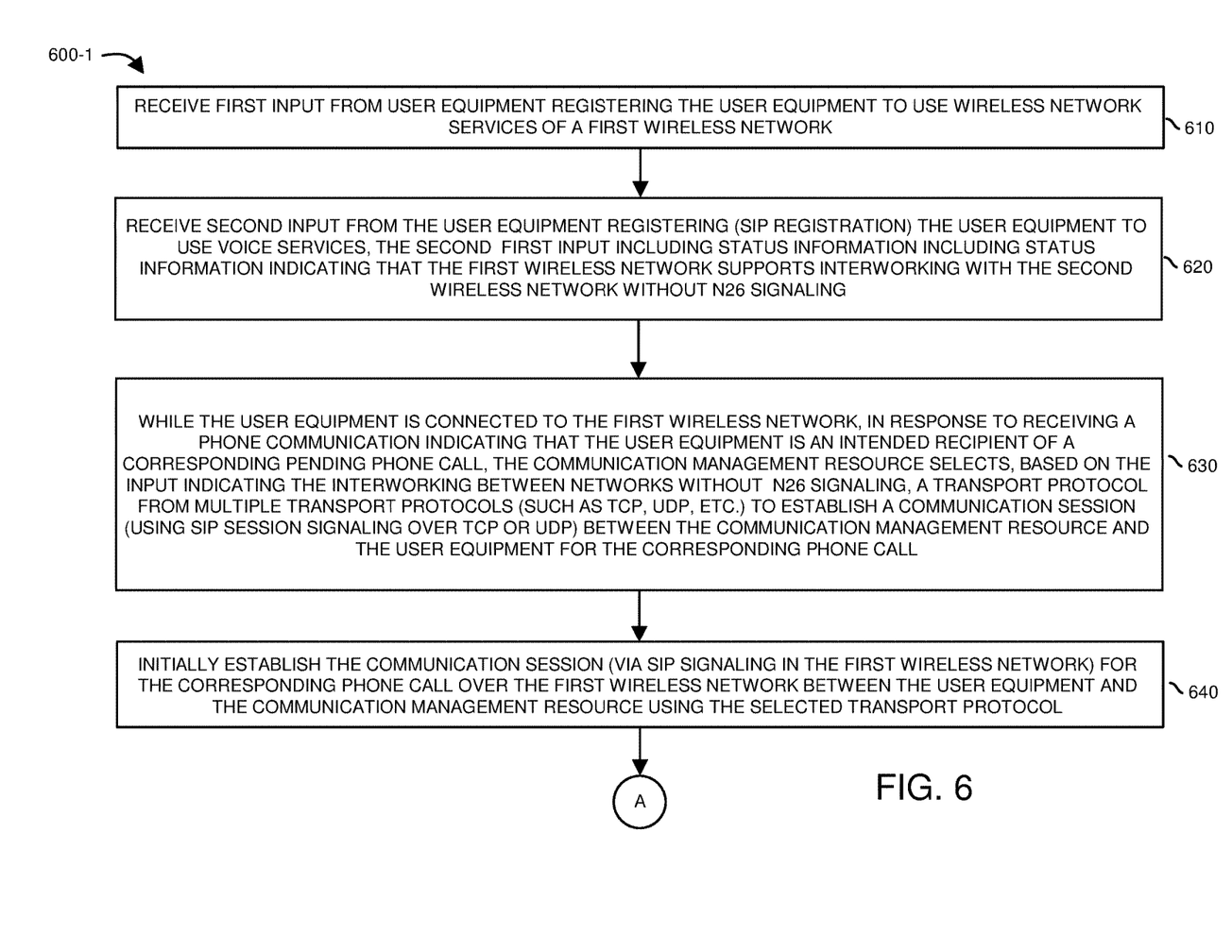
FIGS. 6 and 7 combine to illustrate an example method according to embodiments herein.
Figure 7:
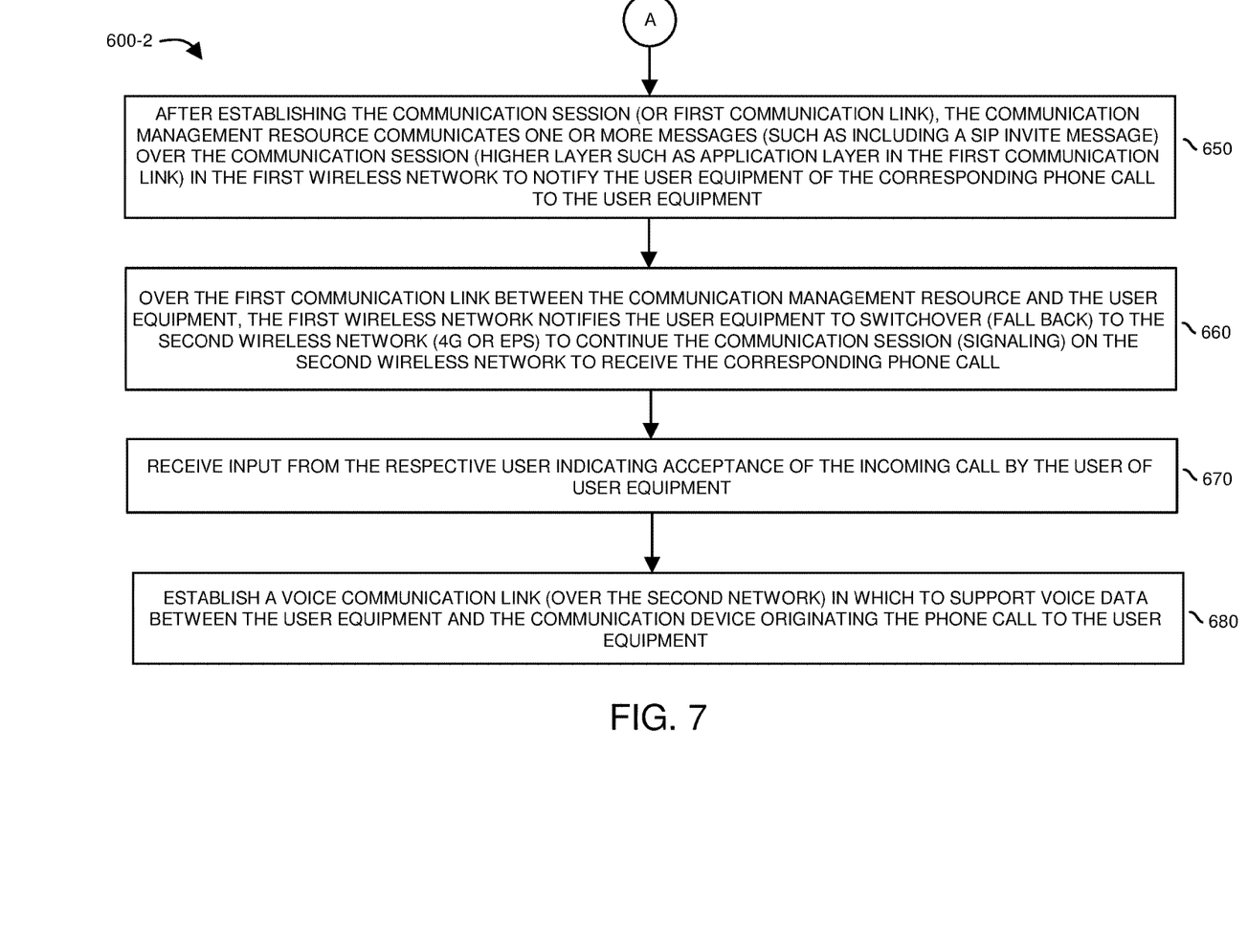

FIGS. 6 and 7 combine to form a flowchart 600 (flowchart 600-1 and flowchart 600-2) illustrating an example method according to embodiments. Note that there will be some overlap with respect to concepts as discussed above.

In processing operation 610, the first wireless network 121 receives first input from user equipment 120 registering the user equipment 120 to use wireless network services of the first wireless network 121. Note that this is also shown in operation #1 of FIG. 1.

Via a corresponding communication link through network 121, the user equipment 120 is able to communicate (such as over a non-voice data link) through network 121 and IMS (IP Multimedia Subsystem) to network 190 and recipients such as corresponding server resources.

In processing operation 620, the communication management resource 140 receives second input from the user equipment 120 (or other suitable resource) registering (SIP registration) the user equipment 120 to use voice services. This is shown in FIG. 1 as operation #2. In one embodiment, the second input to the communication management resource 140 includes status information indicating that there is interworking between the first wireless network and the second wireless network but no support for N26 signaling between (corresponding management nodes of) the first wireless network 121 and the second wireless network 122.

As previously discussed, note again that alternative embodiments include storing the status information (indicating interworking with the second wireless network to establish voice calls without N26 signaling) in the PCF node (or any suitable accessible repository) of network environment 100 during registration of the user equipment 140. For example, during registration of the user equipment 140, the AMF node in network environment 100 can be configured to communicate the status information indicating no N26 signaling to the PCF node. When the user equipment 120 performs registration with the communication management resource 140, the communication management resource 140 can be configured to retrieve the status information indicating no N26 signaling from the PCF node or other suitable resource.

Thus, as an alternative to receiving the status information (of no N26 signaling) from the user equipment 120 during voice registration, the communication management resource 140 can be configured to communicate with the PCF node (or other suitable resource) to receive the status information indicating that the first wireless network 121 supports interworking with the second wireless network to establish voice calls without N26 signaling.

Accordingly, the communication management resource 140 can receive the status information indicating interworking and no N26 signaling between networks in different ways.

In processing operation 630, while the user equipment 120 is connected to the communication management resource 140 over the first wireless network 121 (such as via a non-voice data connection in which the user equipment 120 is able to communicate over wireless network 121 through the communication management resource 140 to the remote network 190), in response to receiving a phone communication (invite 210 in operation #3 of FIG. 2 such as a Mobile Terminating call invite such as from communication device 196) indicating that the user equipment 120 is an intended recipient of a corresponding pending phone call from the communication device 196, the communication management resource 140 selects (such as also shown in operation #4 of FIG. 2), based on the status information indicating the interworking between networks without N26 signaling, a transport protocol from multiple selectable transport protocols (such as TCP, UDP, etc.) to establish a communication session (using SIP session signaling over TCP or UDP) between the communication management resource 140 and the user equipment 120 for the corresponding phone call.

In one embodiment, as previously discussed, if UDP is selected as the transport protocol, the communication management resource 140 can be configured to use a UDP transport with a specific SIP message retransmission schema to accommodate the communication link break (when switching from use of wireless network 121 to wireless network 122 to support the call) and potential lost messages during the subsequent switchover. In other words, the switchover from the first wireless network 121 to the second wireless network 122 to support the voice call can result in lost communications between the communication management resource 140 and the user equipment 120.

Figure 2:
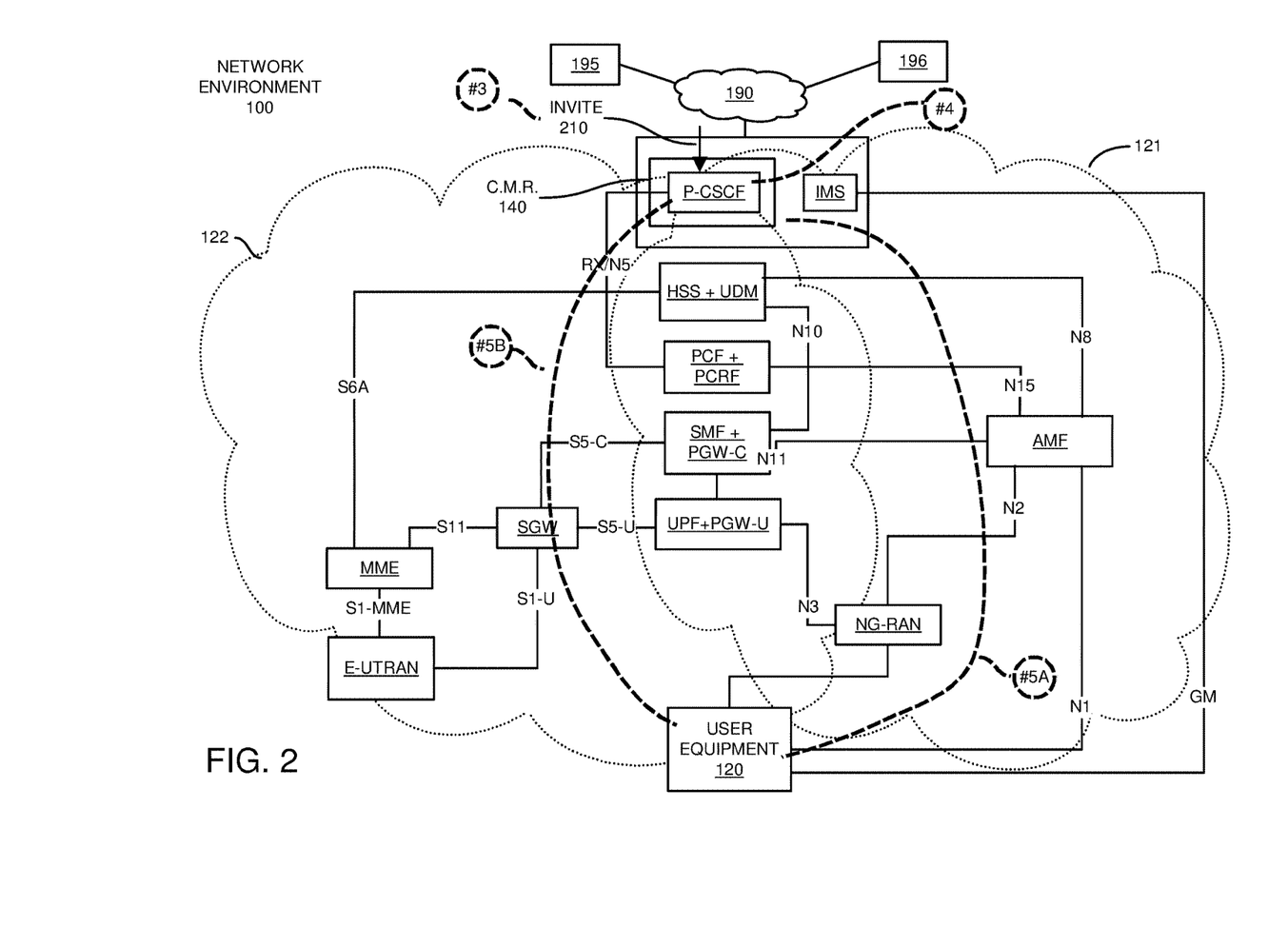
FIG. 2 is an example diagram illustrating signaling to provide connectivity of user equipment through a second wireless network according to embodiments herein.

In processing operation 640, such as also shown in operation #5A in FIG. 2, the communication management resource 140 and corresponding first wireless network 121 initially establish or attempt to establish the communication session (such as via SIP signaling in the first wireless network 121) for notification of the corresponding phone call over the first wireless network 121 between the user equipment 120 and the communication management resource 140 using the selected transport protocol (in operation #4).

In processing operation 650, after establishing the communication session (or first communication link in wireless network 121 such as via operation #5A to provide notification of the incoming call to the user equipment 120), the communication management resource 140 communicates one or more messages (such as including an SIP invite message or invite 210) over the communication session (higher layer such as application layer in the first communication link) over the first wireless network 121 to notify the user equipment 120 of the corresponding phone call (Mobile Terminal invite 210) to the user equipment 120.

Figure 3:
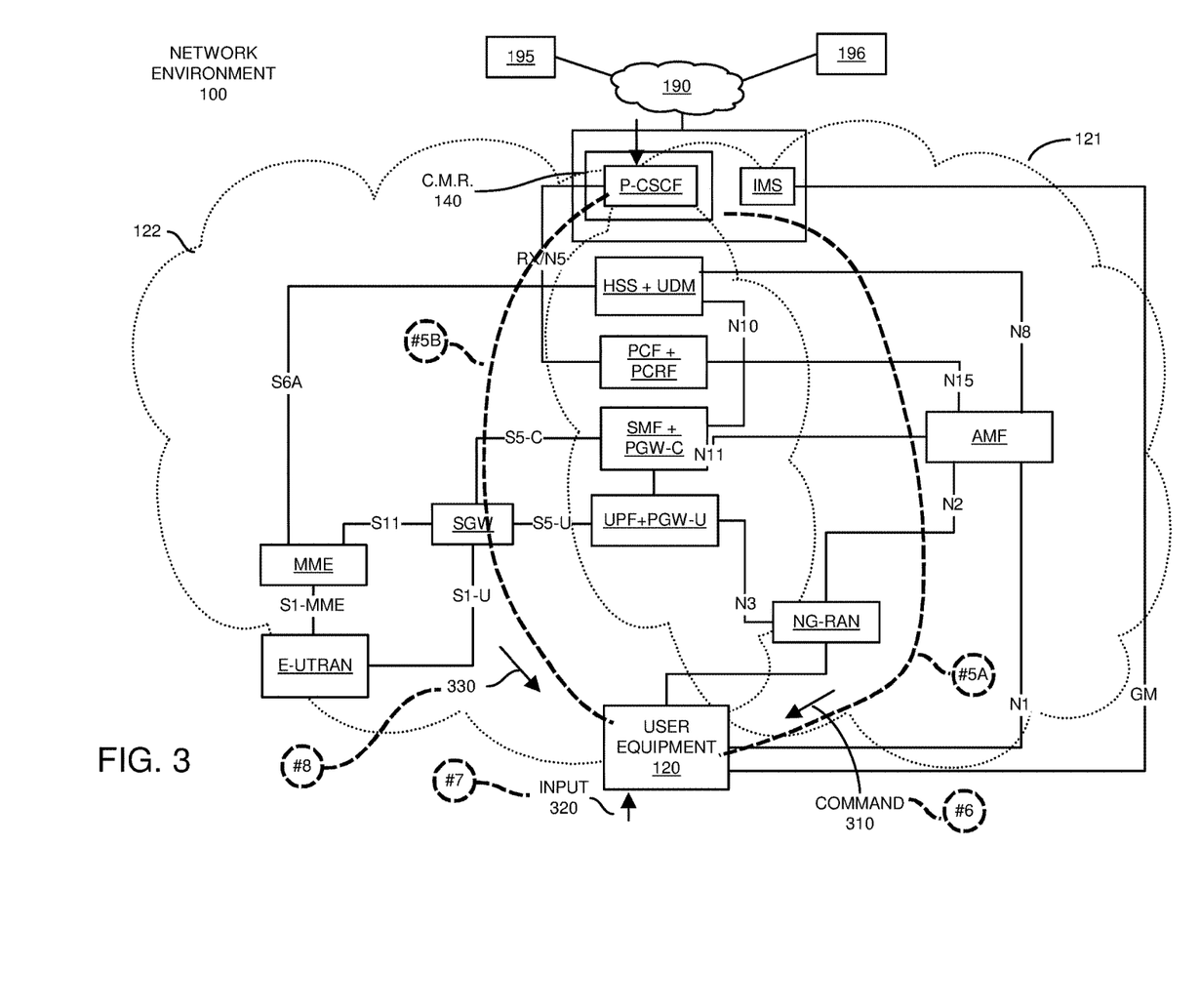
FIG. 3 is an example diagram illustrating connectivity of user equipment through a second wireless network according to embodiments herein.

In processing operation 660, such as via command 310 in operation #6 of FIG. 3, over the first communication link in wireless network 121 between the communication management resource 140 and the user equipment 120, the first wireless network 121 notifies the user equipment 120 to switchover (fall back) to signaling over the second wireless network 122 (such as 4G network or EPS) to continue establishing (such as operation #5B in FIG. 3) the communication session (or prior signaling to establish a call connection in wireless network 121) over the second wireless network to establish a corresponding communication link to support voice communications associated with the corresponding phone call.

In processing operation 670, (such as operation #7 in FIG. 3), the user equipment receives input 320 from the respective user. In one embodiment, the input 320 indicates acceptance of the incoming call by the user of user equipment 120.

In processing operation 680, the user equipment 120 and corresponding network 122 establish a voice communication link (over the second network 122) in which to support voice data between the user equipment 120 and the communication device 196 originating the phone call to the user equipment 120.

Note again that techniques herein are well suited to facilitate connectivity to resources over a remote network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via first input, registering user equipment for use of wireless network services provided by a first wireless network; and
   at a communication management resource that provides access to a remote network: i) receiving second input, the second input received over the first wireless network from the user equipment registering the user equipment to use voice services, ii) receiving notification that interworking exists between the first wireless network and a second wireless network; iii) in response to receiving a phone communication indicating a corresponding phone call directed to the user equipment from a remote communication device, and based on the notification of the interworking, selecting a transport protocol from multiple transport protocols, and iv) establishing a communication session between the communication management resource and the user equipment using the selected transport protocol.

2. The method as in claim 1 further comprising:
   communicating a message over the communication session in the first wireless network, the message notifying the user equipment of the corresponding phone call.

3. The method as in claim 2, further comprising:
   providing notification to the user equipment, the notification handing off the user equipment to the second wireless network to support the corresponding phone call indicated by the phone communication.

4. The method as in claim 3 further comprising:
   establishing a communication link over the second wireless network; and
   initiating a handoff of the user equipment from the communication session supported by the first network to the communication link in the second network, the communication link in the second wireless network supporting the corresponding phone call.

5. The method as in claim 4, wherein the second input includes status information indicating that the first wireless network supports interworking with the second wireless network without N26 signaling.

6. The method as in claim 5, wherein the user equipment communicates the status information to the communication management resource, the user equipment receiving the status information from a resource in the first wireless network during the registering.

7. The method as in claim 1 further comprising:
   prior to receiving the phone communication indicating the corresponding phone call, supporting a data session between the user equipment and the communication management resource to access the remote network.

8. The method as in claim 1 further comprising:
   selecting UDP as the transport protocol; and
   adjusting, for the selected UDP transport protocol, timing of message retransmission from the communication management resource to the user equipment to accommodate an outage of communication occurring when handing off the user equipment from the first wireless network to the second wireless network.

9. The method as in claim 1, wherein the multiple protocols include TCP (Transmission Control Protocol) and UDP (User Datagram Protocol).

10. The method as in claim 1 further comprising:
    at the communication management resource, receiving status information from a resource in the first wireless network, the resource receiving the status information during the registering of the user equipment for use of the wireless network services, the status information indicating that the first wireless network supports interworking with the second wireless network without N26 signaling.

11. The method as in claim 1, wherein the second input includes the notification indicating the interworking between the first wireless network and the second wireless network.

12. The method as in claim 11, wherein the user equipment receives the notification of the interworking during the registering of the user equipment for use of the wireless network services of the first wireless network.

13. The method as in claim 1 further comprising:
    using the selected protocol, providing notification of the corresponding phone call over the communication session in the first wireless network.

14. The method as in claim 13 further comprising:
    communicating a command from the communication management resource over the communication session to the user equipment; and
    wherein the user equipment, in response to receiving the command, uses a communication link in the second network between the user equipment and the communication management resource to receive voice communications associated with the corresponding phone call from the remote communication device.

15. The method as in claim 1, wherein the communication management resource includes a Proxy-Call Session Control Function providing the user equipment connectivity over the first wireless network to the remote network, the first wireless network operable to convey non-voice communications on behalf of the user equipment.

16. The method as in claim 15, wherein the second input includes the notification indicating the interworking between the first wireless network and the second wireless network;
    wherein the user equipment receives the notification of the interworking during the registering of the user equipment for use of the wireless network services of the first wireless network.

17. The method as in claim 16 further comprising:
    using the selected protocol, providing notification of the corresponding phone call directed to the user equipment over the communication session in the first wireless network; and communicating a command from the communication management resource over the communication session to the user equipment; and wherein the user equipment, in response to receiving the command, uses a communication link in the second wireless network between the user equipment and the communication management resource to receive voice communications associated with the corresponding phone call from the remote control device.

18. A system comprising:

a first wireless network, user equipment providing first input to register the user equipment for use of wireless network services of the first wireless network;

a communication management resource providing access to a remote network, the communication management resource operable to:

receive second input, the second input received over the first wireless network from the user equipment registering the user equipment to use voice services;

receive notification that interworking exists between the first wireless network and a second wireless network;

in response to receiving a phone communication indicating a corresponding phone call directed to the user equipment from a remote communication device, and based on the notification of the interworking, select a transport protocol from multiple transport protocols; and establish a communication session between the communication management resource and the user equipment using the selected protocol.

19. The system as in claim 18, wherein the communication management resource is operable to:

establish the communication session over the first wireless network between the user equipment and the communication management resource using the selected transport protocol.

20. The system as in claim 18, wherein the communication management resource is operable to:

communicate a message over the communication session in the first wireless network, the message notifying the user equipment of the corresponding phone call.

21. The system as in claim 20, wherein the first wireless network is operable to:

provide notification to the user equipment, the notification handing the user equipment to the second wireless network to support the corresponding phone call indicated by the phone communication.

22. The system as in claim 21, wherein the communication management resource is operable to:

establish a new communication link over the second wireless network; and initiate a handoff of the user equipment from the communication session supported by the first network to the communication link in the second network, the communication link in the second wireless network supporting the corresponding phone call.

23. The system as in claim 22, wherein the second input includes status information indicating that the first wireless network supports interworking with the second wireless network without N26 signaling.

24. The system as in claim 23, wherein the user equipment communicates the status information to the communication management resource, the user equipment receiving the status information from a resource in the first wireless network during the registering.

25. The system as in claim 18, wherein the communication management resource is operable to:

select UDP as the transport protocol; and adjust, for the selected UDP transport protocol, timing of message retransmission from the communication management resource to the user equipment to accommodate an outage of communication occurring when handing off the user equipment from the first wireless network to the second wireless network.

26. The system as in claim 18, wherein the phone call originates from a remote mobile communication device in communication with the communication management resource over a network.

27. The system as in claim 18, wherein the communication management resource is operable to:

receive status information from a resource in the first wireless network, the resource receiving the status information during the registering of the user equipment for use of the wireless network services, the status information indicating that the first wireless network supports interworking with the second wireless network without N26 signaling.

28. Computer-readable storage hardware having instructions stored thereon, the instructions, when carried out by computer processor hardware, cause the computer processor hardware to:

via first input, register the user equipment for use of wireless network services provided by a first wireless network; and at a communication management resource that provides access to a remote network: i) receive second input, the second input received over the first wireless network from the user equipment registering the user equipment to use voice services; ii) receive notification that interworking exists between the first wireless network and a second wireless network; and iii) in response to receiving a phone communication indicating a corresponding phone call directed to the user equipment from a remote communication device, and based on the notification of the interworking, select a transport protocol from multiple transport protocols; and iv to establish a communication session between the communication management resource and the user equipment using the selected transport protocol.

* * * * *